(12) United States Patent
Gabbert et al.

(10) Patent No.: US 7,120,877 B2
(45) Date of Patent: Oct. 10, 2006

(54) SYSTEM AND METHOD FOR CREATING A GRAPHICAL PROGRAM INCLUDING A PLURALITY OF PORTIONS TO BE EXECUTED SEQUENTIALLY

(75) Inventors: Adam Gabbert, Austin, TX (US); Jeff Washington, Round Rock, TX (US)

(73) Assignee: National Instruments Corporation, Austin, TX (US)

( * ) Notice: Subject to any disclaimer, the term of this patent is extended or adjusted under 35 U.S.C. 154(b) by 522 days.

(21) Appl. No.: 09/832,997

(22) Filed: Apr. 10, 2001

(65) Prior Publication Data

US 2002/0145629 A1 Oct. 10, 2002

(51) Int. Cl.
*G06F 3/00* (2006.01)

(52) U.S. Cl. .................. 715/804; 715/805; 703/14; 703/15

(58) Field of Classification Search ........... 703/14; 345/804, 805, 792; 715/804, 805, 792
See application file for complete search history.

(56) References Cited

U.S. PATENT DOCUMENTS

| | | | |
|---|---|---|---|
| 4,970,664 A * | 11/1990 | Kaiser et al. ............... 345/804 |
| 5,291,587 A * | 3/1994 | Kodosky et al. ............... 703/2 |
| 5,301,301 A * | 4/1994 | Kodosky et al. ............... 716/11 |
| 6,421,072 B1 * | 7/2002 | Ku et al. ..................... 345/804 |
| 6,480,816 B1 * | 11/2002 | Dhar ........................... 703/14 |

OTHER PUBLICATIONS

G Programming Reference Manual, "Case and Sequence Structures", National Instruments Corp. 1998, pp. 19-13 thru 19-26.

* cited by examiner

*Primary Examiner*—Raymond J. Bayerl
*Assistant Examiner*—Dennis Bonshock
(74) *Attorney, Agent, or Firm*—Meyertons Hood Kivlin Kowert & Goetzel, P.C.; Jeffrey C. Hood; Jason L. Burgess

(57) ABSTRACT

A system and method for creating a graphical program including a plurality of portions to be executed sequentially. User input may be received, e.g., during development of the graphical program, wherein the user input indicates a desire to specify a plurality of portions of graphical source code to be executed sequentially. In response, a plurality of frames may be displayed in the graphical program, such that two or more frames from the plurality of frames are visible at the same time. A portion of graphical source code may be included in each frame in response to user input. The plurality of frames may define an execution order for the corresponding portions of graphical source code, such that during execution of the graphical program, the portions of graphical source code are executed sequentially according to this execution order. In the preferred embodiment, all of the frames are visible at the same time, thus giving the program developer a complete view of the graphical program.

35 Claims, 11 Drawing Sheets

SYSTEM AND METHOD FOR CREATING A GRAPHICAL PROGRAM INCLUDING A PLURALITY OF PORTIONS TO BE EXECUTED SEQUENTIALLY

FIELD OF THE INVENTION

The present invention relates to the field of graphical programming, and more particularly to a system and method for creating a graphical program including a plurality of portions to be executed sequentially.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are typically translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures may be automatically constructed which characterize an execution procedure which corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for measuring, controlling, or modeling devices, such as instruments, processes or industrial automation hardware, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation and numerical analysis, as well as for any type of general programming.

In creating a graphical program, a user may create a front panel or user interface panel. The front panel may include various user interface elements or front panel objects, such as controls and/or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

One particular aspect of graphical programming which is somewhat different from programming in many text-based programming languages has to do with execution order for different portions of the program. Many text-based programming languages such as C, BASIC, etc., have an inherent control flow because statements execute in the order in which they appear in the program. In contrast, for many types of graphical programs, data flow is the main principle governing program execution. In other words, in a graphical program that is based on a data flow model, a node may execute when all data inputs have arrived at the node's input terminals. The node may then supply data to its output terminals when the node has finished executing, and this data may then (may immediately) pass to input terminals of other nodes in the diagram that are connected to the node's output terminals. Thus, for this type of graphical program, execution of different portions of the program is data-driven.

Thus, in a pure data-flow model, execution order for different portions of the graphical program is not necessarily guaranteed.

Therefore, for many data-flow based graphical programs, it is necessary to introduce a layer of control flow over the basic data-flow model. It is often necessary to explicitly specify an execution order for different portions of a graphical program to force the portions to execute in a desired sequential order. One prior art technique for specifying a sequential order for different graphical program portions is illustrated in FIGS. 1–3.

FIGS. 1–3 illustrate a prior art LabVIEW graphical program that utilizes a sequence structure. In this example, the sequence structure includes two frames, and an ordering is assigned among the frames, such that the portion of graphical source code in frame 0 (illustrated in FIG. 1) executes before the portion of graphical source code in frame 1 (illustrated in FIG. 2). In this example, the purpose of the program is to determine the amount of time it takes to match a given integer between 1 and 100 by randomly computing integers using a random number function node. FIG. 3 illustrates a user interface panel for the program that enables the user to input a number to be matched and displays the elapsed time and number of iterations it took to match the input number. The portion of graphical source code in frame 1 computes the elapsed time; thus, this portion of the program must execute after a random number that matches the input number has been found, which is performed by the portion of graphical source code in frame 0.

Although the use of a sequence structure such as shown in prior art FIGS. 1–3 does serve the purpose of specifying a desired execution order for different portions of the graphical program, there are several drawbacks to this approach. In particular, the graphical program is hard to read because only one frame is visible at a time. In this example, the user must choose to view either frame 0 or frame 1 exclusively and may toggle between these frames using the toggle arrows shown at the top. Thus, the user is unable to see the entire graphical program at once. In this simple example, this is not a major problem, but in a larger and more complex graphical program the inability to see the entire graphical program makes the program hard to understand. In addition, in order to edit a particular portion of the graphical program, the user must first navigate to the desired portion. It would be desirable to provide an improved sequence structure for use in a graphical program, such that all frames in the sequence are visible at the same time, making the graphical program easy to read and edit.

Another drawback with the prior art sequence structure discussed above is the technique it provides for passing data from one frame to another. FIGS. 4–6 illustrate an example of passing data from one frame to another in the prior art. According to the technique shown in this example, a sequence local variable is used. The local variable is set by an output terminal of a node in frame 1 (FIG. 5). (In frame 0 (FIG. 4), the local variable is dimmed, since the variable value cannot be used before it is set and it is not set until frame 1. The variable value is used in frame 2 (FIG. 6) as an input to a node. The direction of the arrow in FIGS. 5 and 6 indicates whether the variable value is set or used within the frame. However, a novice user may not understand this somewhat esoteric notation. Moreover, in FIG. 6, it is not immediately obvious where the variable data originates from, i.e., from which frame and from which node in that frame. Thus, it would also be desirable to provide a more straightforward way to pass data between frames of a sequence.

SUMMARY OF THE INVENTION

One embodiment of the present invention comprises a system and method for creating a graphical program including a plurality of portions to be executed sequentially. As discussed above, it may be necessary to specify an execution order for different portions of the graphical program, to ensure that the portions execute in the desired order. According to one embodiment of the method, user input may be received, e.g., during development of the graphical program, wherein the user input indicates a desire to specify a plurality of portions of graphical source code to be executed sequentially. In one embodiment, this may comprise receiving user input specifying inclusion of a "sequence structure" in the graphical program, wherein the sequence structure enables the user to specify an execution order for different portions of the graphical program.

In response to this user input, a plurality of frames may be displayed in the graphical program, such that two or more frames from the plurality of frames are visible at the same time. In an embodiment in which a sequence structure is utilized, the sequence structure may comprise the plurality of frames. A portion of graphical source code may be included in each frame in response to user input. The plurality of frames may define an execution order for the corresponding portions of graphical source code, such that during execution of the graphical program, the portions of graphical source code are executed sequentially according to this execution order.

Since two or more frames from the plurality of frames are visible at the same time, the user can advantageously view more than one of the portions of graphical program source code at the same time, making the graphical program easier to understand and edit. In the preferred embodiment, all of the frames are visible at the same time, thus giving the program developer a complete view of the graphical program (or at least as much of the program as can be viewed on the display screen of the computer system).

The frames may be positioned or laid out within the graphical program in any of various ways. In one embodiment, the frames may be displayed side by side in a left-to-right order, e.g., such that the right-side border of one frame is also the left-side border of an adjacent frame. In other embodiments, frames may be positioned in an up-to-down order, or in a combination of left-to-right and up-to-down orders.

Any of various systems may be used in determining the execution order of the frames. In one embodiment, the execution order for a particular frame may be inherently specified by the frame's location among the other frames. For example, if the frames are displayed in a left-to-right order, then execution of the frames (i.e., execution of the graphical source code portions within the frames) may also proceed in this same left-to-right order. In another embodiment, the user may provide user input to specify a desired execution order for the frames.

In one embodiment, nesting of frames may be allowed. For example, for a given portion of the graphical program that is associated with a frame, it may be necessary to break the portion down into sub-portions to be executed sequentially. Thus, nested frames may be included in the frame to specify the desired execution order of the sub-portions.

Once the graphical program has been created as described above, the program may be executed. Executing the graphical program may comprise executing each portion of graphical source code associated with the plurality of frames sequentially, according to the execution order defined by frames.

In one embodiment, a graphical programming development environment may supply various predefined templates upon which to base a graphical program or program portion. Each template may correspond to a commonly performed type of program operation, and the user may include the template within the graphical program. For operations that need to perform a plurality of steps in sequential order, the templates may include a plurality of frames such as described above. An example of a template browser window is described, wherein the window displays a template that utilizes frames to specify sequential execution for different program portions.

BRIEF DESCRIPTION OF THE DRAWINGS

A better understanding of the present invention can be obtained when the following detailed description of the preferred embodiment is considered in conjunction with the following drawings, in which.

Figure 1:
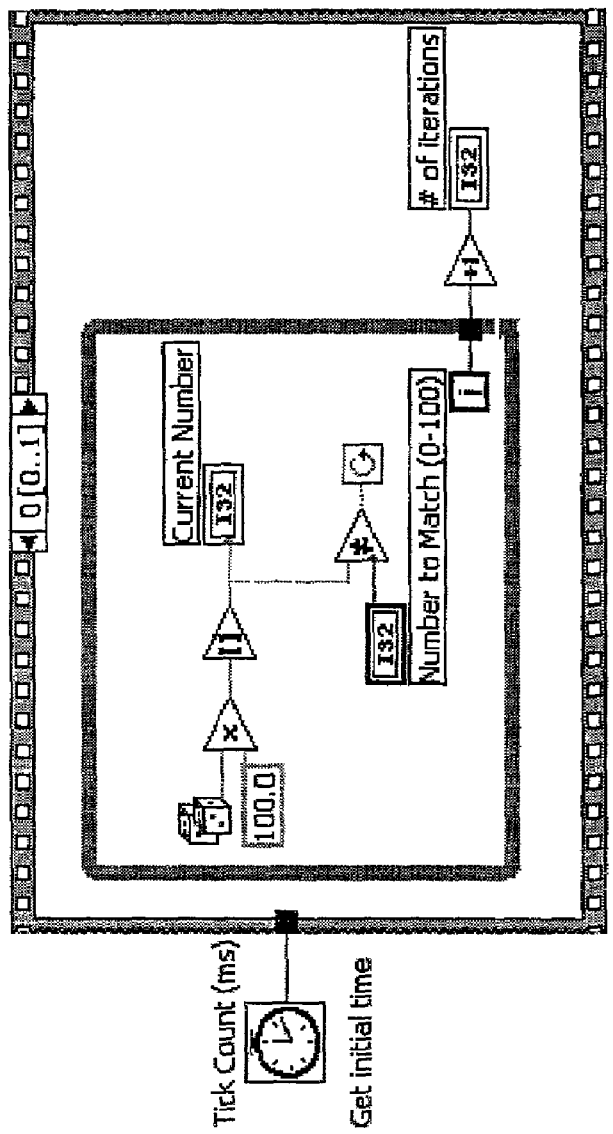
FIGS. 1–3 illustrate a prior art technique for specifying a sequential order for different graphical program portions.

While the invention is susceptible to various modifications and alternative forms specific embodiments are shown by way of example in the drawings and are herein described in detail. It should be understood however, that drawings and detailed description thereto are not intended to limit the invention to the particular form disclosed, but on the contrary the invention is to cover all modifications, equivalents and alternative following within the spirit and scope of the present invention as defined by the appended claims.

DETAILED DESCRIPTION OF THE PREFERRED EMBODIMENTS

Figure 7A:
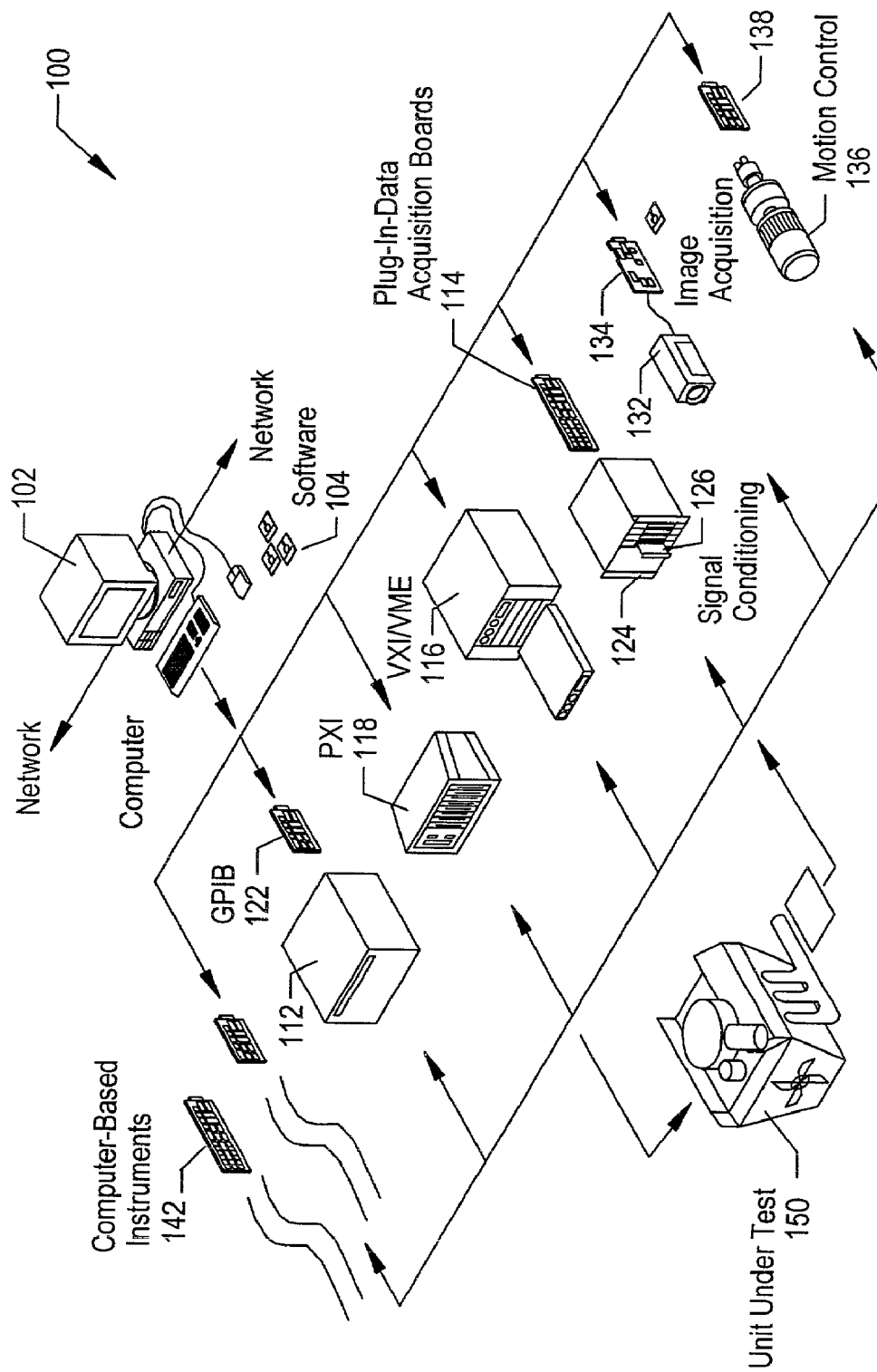
FIGS. 7A and 7B illustrate representative instrumentation and process control systems including various I/O interface options.
Figure 7B:
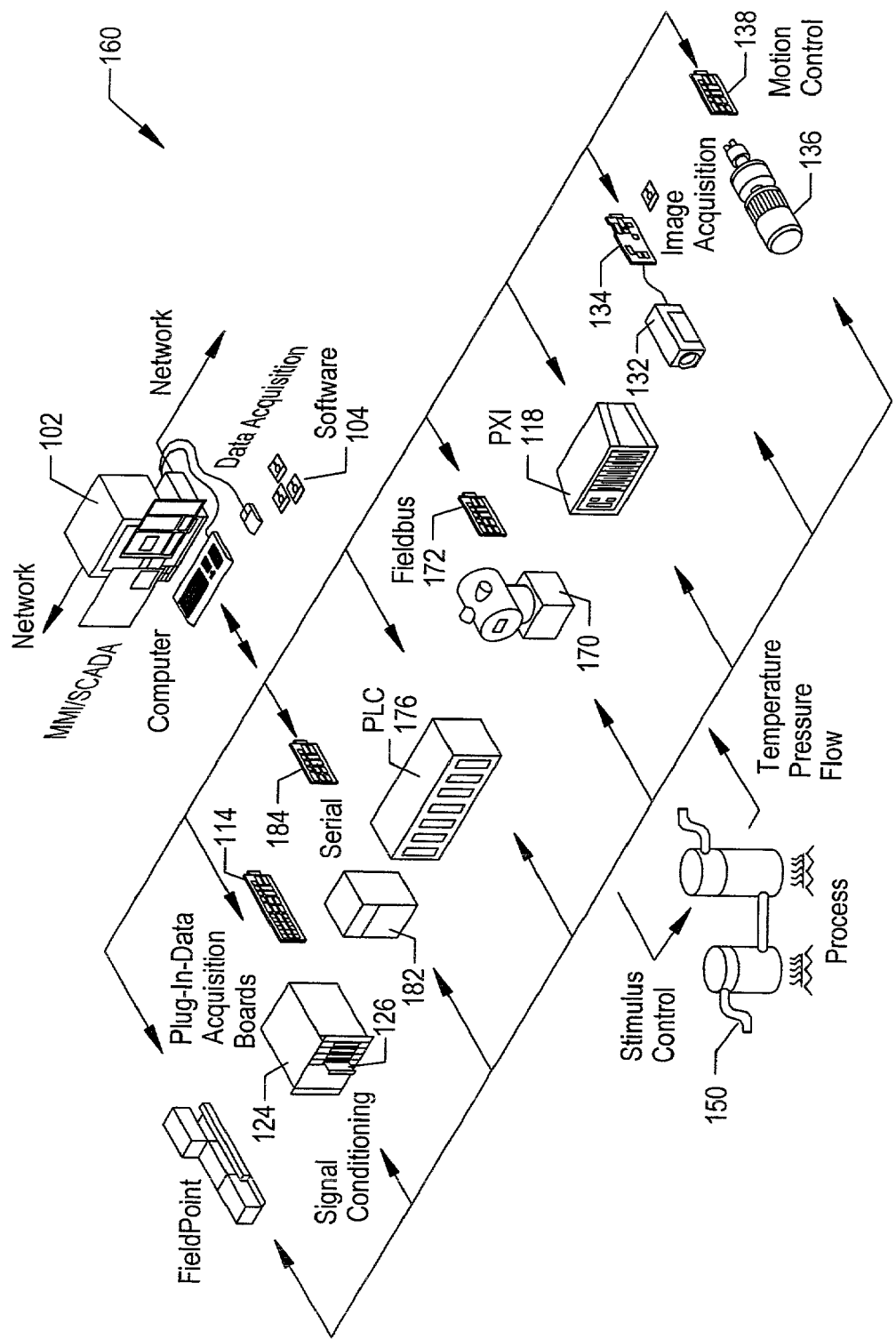

FIGS. 7A and 7B—Instrumentation and Industrial Automation Systems

FIGS. 7A and 7B illustrate exemplary computer systems which may store or execute an application operable to create a graphical program including a plurality of portions to be executed sequentially, according to the method described below. For example the computer systems shown in FIGS. 7A and 7B may store or execute a graphical programming development environment application operable to create such a graphical program.

Also, these systems may store or execute a graphical program that has been created according to the method described below. For example, the graphical program may include a sequence structure comprising a plurality of frames, wherein a portion of graphical source code is associated with each frame. The plurality of frames may define an execution order for the respective portions of graphical source code such that during execution of the graphical program, the portions of graphical source code are executed sequentially. As described below, during editing or display of the graphical program, the frames are preferably displayed at the same time, making the graphical program easier to create and understand.

In the examples of FIGS. 7A and 7B, the created graphical program may perform an instrumentation function involving one or more of the devices shown, such as a test and measurement function or an industrial automation function. For example, the graphical program may output a signal to a device, may then wait for a period of time while the device processes the signal or performs an operation directed by the signal, and may then read data from the device and process and display the data. In this example, the graphical program may utilize a sequence structure to ensure that portions of the graphical program corresponding to these steps are executed in the correct order, e.g., to ensure that the wait step is performed after the step of sending the signal to the device, etc.

It is noted that the application that creates the graphical program and the graphical program itself may be stored in or used by any of various other types of systems as desired and may implement any function or application as desired, in addition to instrumentation functions. Thus, FIGS. 7A and 7B are exemplary only.

FIG. 7A illustrates an exemplary instrumentation control system 100. The system 100 comprises a host computer 102 which connects to one or more instruments. The host computer 102 may comprise a CPU, a display screen, memory, and one or more input devices such as a mouse or keyboard as shown. The computer 102 connects through the one or more instruments to analyze, measure, or control a unit under test (UUT) or process 150. In one embodiment, the computer 102 may execute a graphical program created according to the method described below, such as a graphical program that controls or models one or more of the connected instruments.

The one or more instruments may include one or more of a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via the GPIB interface card 122 comprised in the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 preferably comprises an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 may be coupled to the computer 102 via a VXI bus, MXI (e.g., MXI-3) bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument will not be present of each interface type, and in fact many systems may only have one or more instruments of a single interface type, such as only GPIB instruments. The one or more instruments are coupled to the unit under test (UUT) or process 150, or are coupled to receive field signals, typically generated by transducers. The system 100 may be used in a data acquisition and control application, in a test and measurement application, a process control application, a man-machine interface application, or other types of applications.

FIG. 7B illustrates an exemplary industrial automation system 160. The industrial automation system 160 is similar to the instrumentation or test and measurement system 100 shown in FIG. 7A. Elements which are similar or identical to elements in FIG. 7A have the same reference numerals for convenience. The system 160 may comprise a computer 102 which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment, the computer 102 may execute a graphical program created according to the method described below, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, USB, or IEEE 1394 or 1394.2 provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 7A and 7B, the computer system(s) 102 preferably includes a memory medium(s) on which one or more computer programs or software components according to one embodiment of the present invention are stored. For example, the memory medium may store an application, such as a graphical programming development environment application, operable to create a graphical program including a plurality of portions to be executed sequentially, according to the method described below. The same or a different memory medium may also store a graphical program that has been created according to the method described below.

The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

Figure 8:
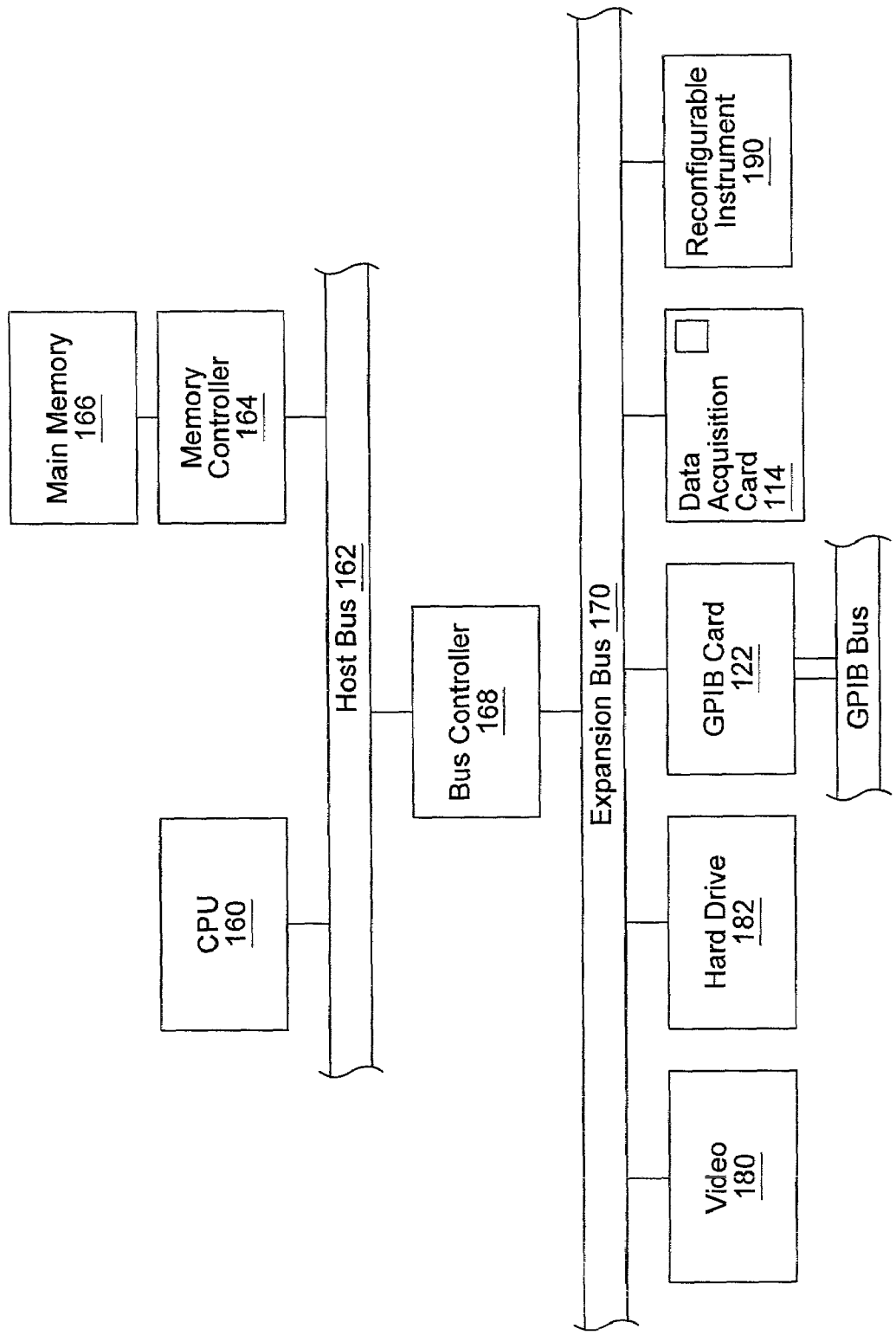
FIG. 8 is a block diagram of the computer system of FIGS. 7A and 7B.

FIG. 8—Computer System Block Diagram

FIG. 8 is a block diagram of the computer system illustrated in FIGS. 7A and 7B. It is noted that any type of computer system configuration or architecture can be used as desired, and FIG. 8 illustrates a representative PC embodiment. It is also noted that the computer system may be a general purpose computer system as shown in FIGS. 7A and 7B, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention, such as described above with reference to FIGS. 7A and 7B. The main memory 166 may also store operating system software as well as other software for operation of the computer system, as well known to those skilled in the art. A computer program(s) stored in the main memory 166 may implement the method described below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 7A) and a GPIB interface card 122 which provides a GPIB bus interface to the GPIB instrument 112 (of FIG. 7A). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. According to one embodiment of the invention, a created graphical program that includes a plurality of portions to be executed sequentially may be downloaded and executed on the reconfigurable instrument 190. For example, a graphical programming development environment with which the graphical program is associated may provide support for downloading the graphical program for execution on configurable logic in a real time system. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 7A.

Figure 9:
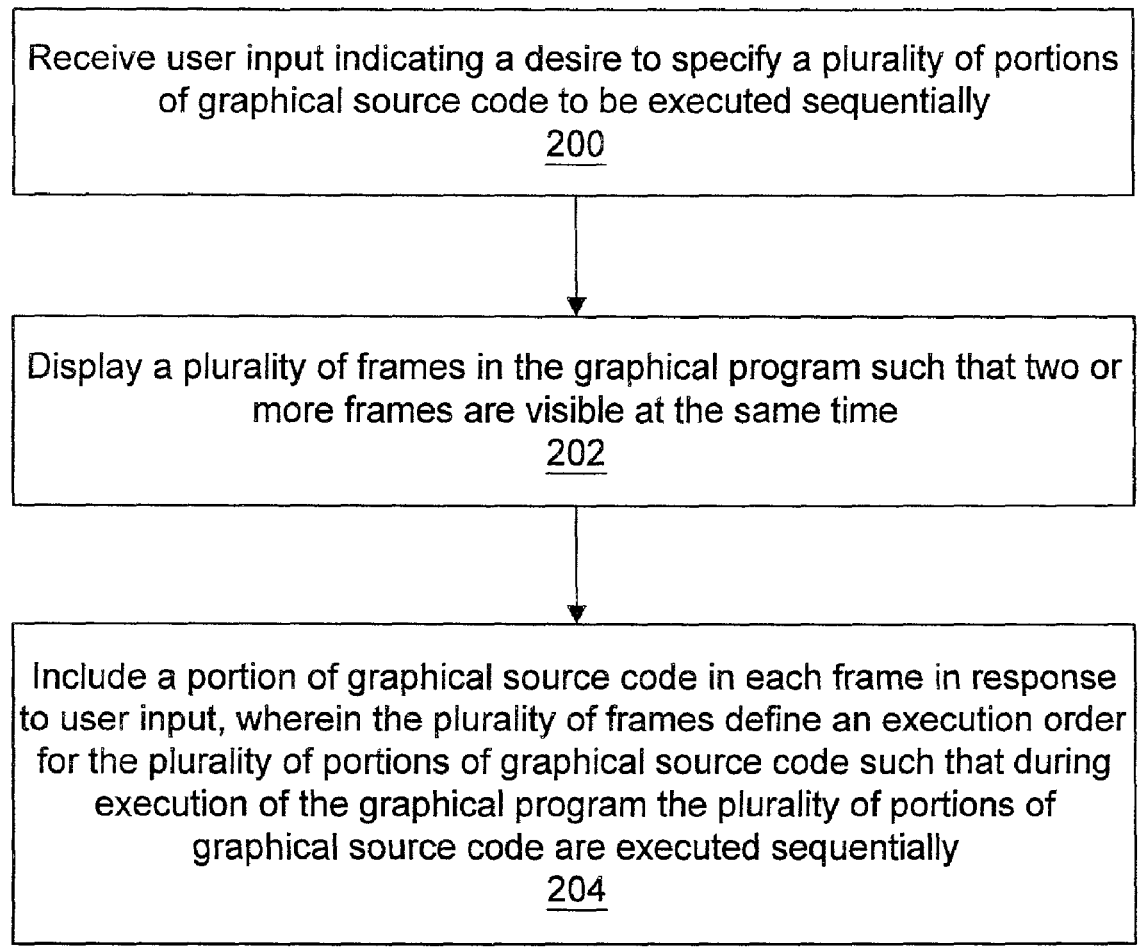
FIG. 9 is a flowchart diagram illustrating one embodiment of a method for creating a graphical program including a plurality of portions to be executed sequentially.

FIG. 9—Method for Creating a Graphical Program Including a Plurality of Portions to be Executed Sequentially FIG. 9 is a flowchart diagram illustrating one embodiment of a method for creating a graphical program including a plurality of portions to be executed sequentially. In one embodiment, the method of FIG. 9 may be implemented by a graphical programming development environment application useable to create a graphical program.

As discussed above, it may be necessary to specify an execution order for different portions of the graphical program, to ensure that the portions execute in the desired order. In step 200, user input may be received, e.g., during development of the graphical program, wherein the user input indicates a desire to specify a plurality of portions of graphical source code to be executed sequentially. In one embodiment, a graphical programming development environment may provide a structure referred to herein as a "sequence structure" for inclusion in a graphical program, wherein the sequence structure enables the user to specify an execution order for different portions of the graphical program. Thus, step 200 may comprise receiving user input specifying inclusion of a sequence structure in the graphical program. For example, the user may choose an icon representing the sequence structure from a palette, may execute a menu option to include the sequence structure in the graphical program, etc.

In response to the user input received in step 200, a plurality of frames may be displayed in the graphical program in step 202, such that two or more frames from the plurality of frames are visible at the same time. In an embodiment in which a sequence structure is utilized, the sequence structure may comprise the plurality of frames. As described below, the initial number of frames in the plurality of frames may vary, and the user may request more frames to be added as desired.

In step 204, a portion of graphical source code may be included in each frame in response to user input. The plurality of frames may define an execution order for the corresponding portions of graphical source code, such that during execution of the graphical program, the portions of graphical source code are executed sequentially according to this execution order.

In the preferred embodiment, the portions of graphical source code may be included in the frames much as if the user were including the portions in a graphical program without any frames. For example, each portion of graphical source code may comprise one or more block diagram nodes or icons, and the user may position the nodes within the desired frame. If two or more nodes are included in the frame, the user may interconnect the two or more nodes as desired, e.g., by wiring together input and output terminals of the nodes to specify data flow among the nodes.

Since two or more frames from the plurality of frames are visible at the same time, the user can advantageously view more than one of the portions of graphical program source code at the same time, making the program easier to understand and edit. In the preferred embodiment, all of the frames are visible at the same time, thus giving the program developer a complete view of the graphical program (or at least as much of the program as can be viewed on the display screen of the computer system). In an embodiment in which not all of the frames are visible at the same time, the user may be able to toggle among the frames, similarly as described above with reference to prior art methods.

The frames may be positioned or laid out within the graphical program in any of various ways. In one embodiment, the frames may be displayed side by side in a left-to-right order, e.g., such that the right-side border of one frame is also the left-side border of an adjacent frame. In other embodiments, frames may be positioned in an up-to-down order, or in a combination of left-to-right and up-to-down orders.

Figure 2:
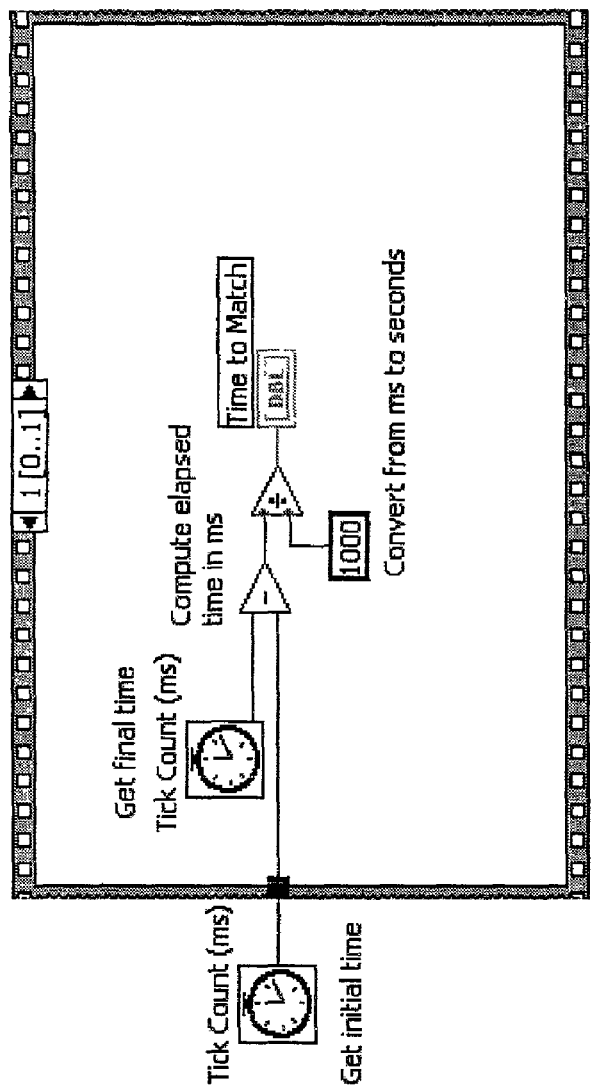
Figure 3:
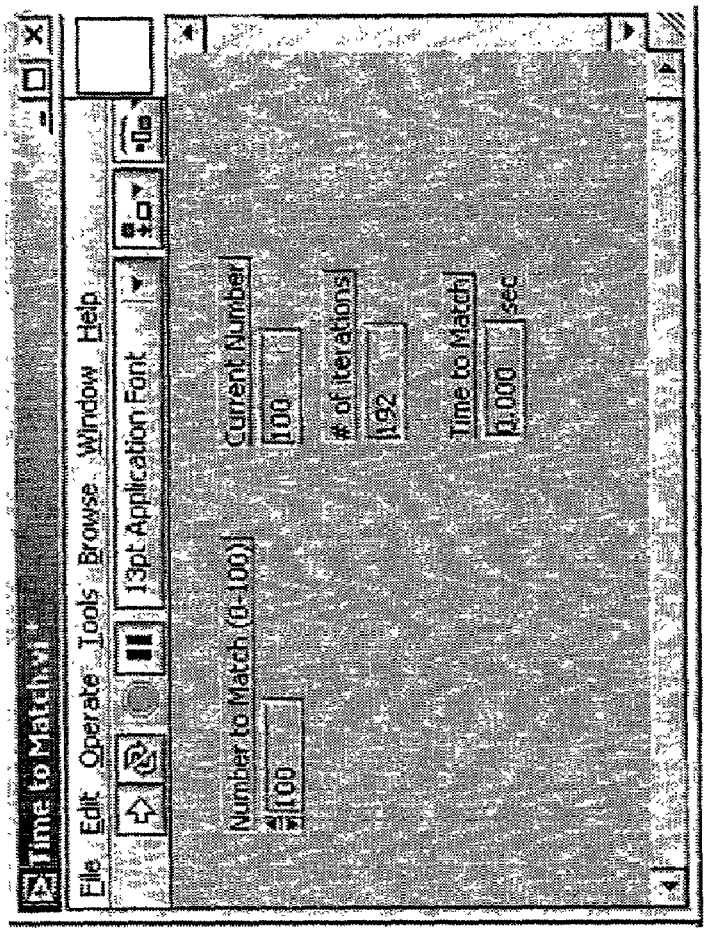
Figure 6:
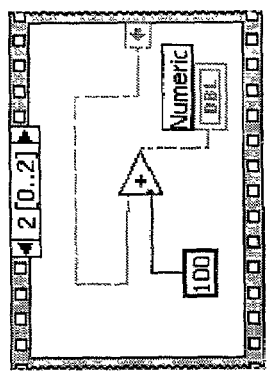
FIGS. 4–6 illustrate an example of passing data from one frame to another in the prior art technique shown in FIGS. 1–3.
Figure 5:
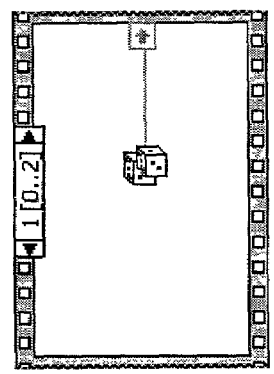
Figure 4:
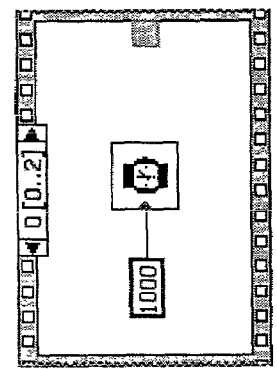
Figure 10:
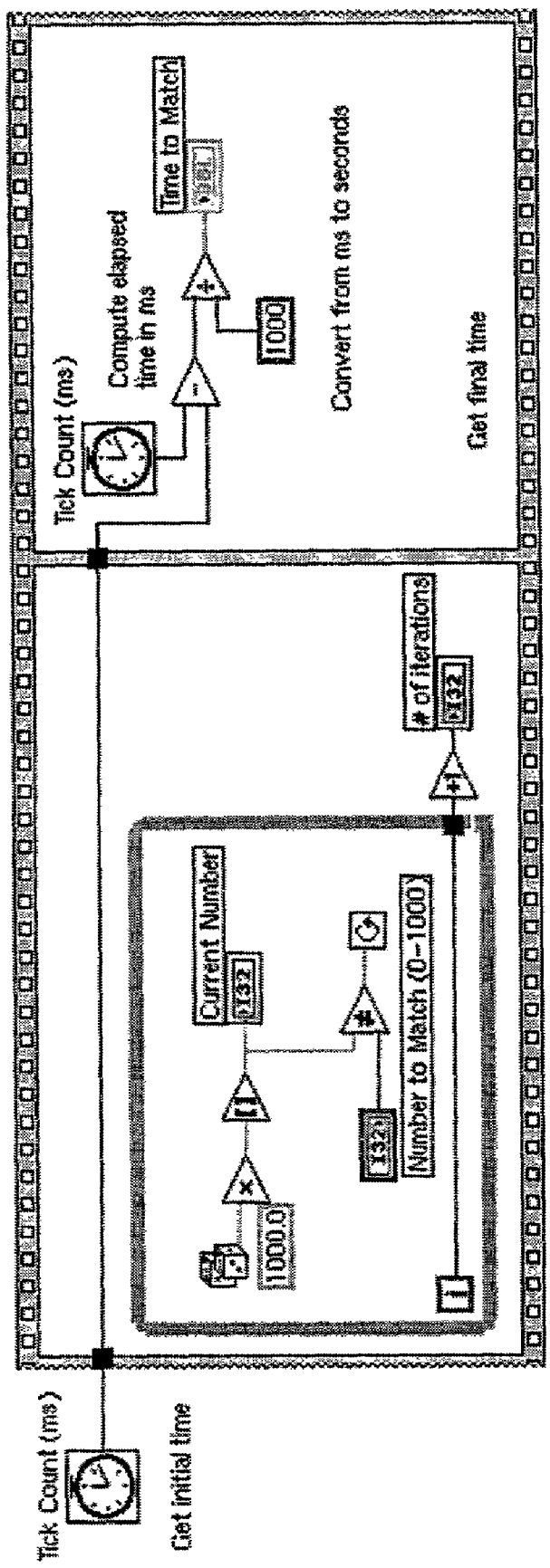
FIG. 10 illustrates one embodiment of a graphical program that performs the same function as the prior art graphical program of FIGS. 1–3, wherein the graphical program includes two frames that are displayed together side by side in a left-to-right order.

FIG. 10 illustrates one embodiment of a graphical program including two frames that are visible at the same time, in which the frames are displayed side by side in a left-to-right order. In this example, the top and bottom edges of the frames have a perforated film-like appearance to indicate to the user that the frames are executed sequentially. The graphical program of FIG. 10 performs the same function as the prior art graphical program of FIGS. 1–3 discussed above. The frame on the left corresponds to FIG. 1, and the frame on the right corresponds to FIG. 2. However, the graphical program of FIG. 10 is more readable since the entire program is visible at once.

Any of various methodologies may be used in determining the execution order of the frames. In one embodiment, the execution order for a particular frame may be inherently specified by the frame's location among the other frames. For example, if the frames are displayed in a left-to-right order such as shown in FIG. 10, then execution of the frames (i.e., execution of the graphical source code portions within the frames) may also proceed in this same left-to-right order. In another embodiment, the user may provide user input to specify a desired execution order for the frames.

In one embodiment, one or more dimensions of the frames may be tied together such that the dimension(s) is/are held constant for all of the frames during editing of the program. For example, if the frames are displayed in a left-to-right order and the user resizes the height of one of the frames, e.g., by clicking and dragging the top or bottom border similarly to techniques for resizing the height of a window, then the height of the other frames may also be automatically changed to this new height. This may result in a more readable and visually aesthetic graphical program.

As noted above, the initial number of frames that are displayed may vary, and the user may request more frames to be added as desired. For example, in response to the user requesting a sequence structure to be included in the graphical program, the sequence structure may initially have a default number of frames, e.g., one or two. The user may then add additional frames as needed, e.g., by using a menu bar option or pop-up context menu to add the frames. In one embodiment, the user may specify a number of frames to be added so that more than one frame can be added to the graphical program at a time. In another embodiment, the user may add frames to the graphical program by selecting a frame icon from a palette and dragging and dropping frames into the program. In other embodiments, frames may be initially displayed or subsequently added in any of various other ways. As frames are added, the frames may be automatically positioned within the graphical program, or the user may position the frames as desired.

The steps of displaying the frames and including graphical source code within the frames may be interleaved. For example, the user may create the graphical source code for a first frame, may then request a new frame to be included in the program, and may then create the graphical source code for the new frame. The user may request the new frame to be added between existing frames if desired. For example, after specifying first and second portions of graphical source code, the user may realize that a third portion of graphical source code actually needs to be executed between the first and second portions and thus may add a new frame between the existing frames. The user may also request for frames to be removed from the graphical program if desired.

Once the graphical program has been created as described above, the program may be executed. Executing the graphical program may comprise executing each portion of graphical source code associated with the plurality of frames sequentially, according to the execution order defined by frames.

Nesting of Frames

Figure 11:
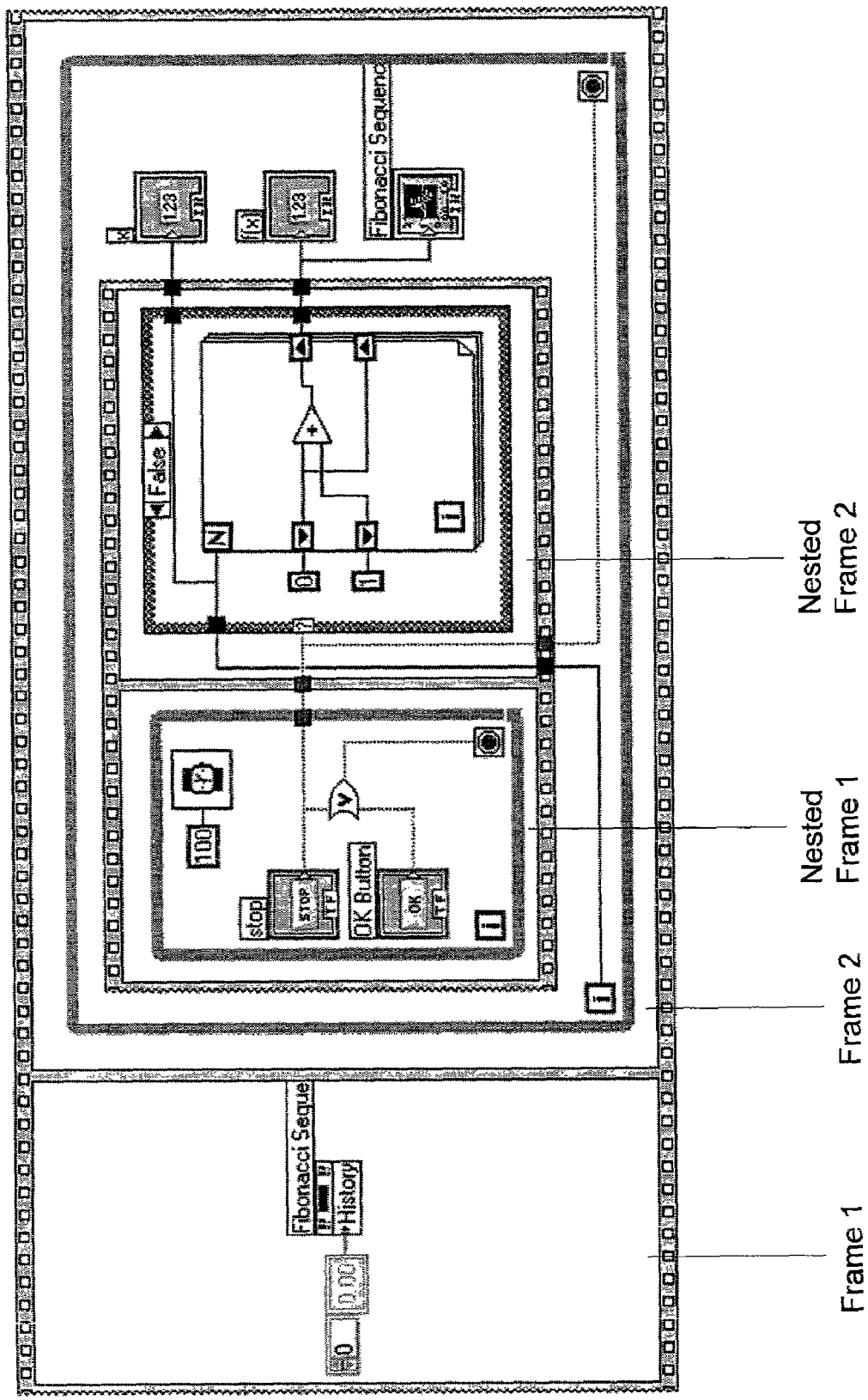
FIG. 11 illustrates an exemplary graphical program including four frames defining sequential execution for the program, two of which are nested within another, wherein all four of the frames are visible at the same time.

In one embodiment, nesting of frames may be allowed. For example, for one or more portions of the graphical program associated with a frame, it may be necessary to break the portions down into sub-portions to be executed sequentially. FIG. 11 illustrates an exemplary graphical program including two frames labeled as Frame 1 and Frame 2. As shown, Frame 2 includes two frames labeled as Nested Frame 1 and Nested Frame 2. In this example, all four of the frames are visible at the same time, giving the program developer a complete view of the program.

In the preferred embodiment, frames may be nested to any desired level. It is noted that in cases where frames are nested, the techniques described herein may be especially advantageous over the prior art technique described above, since the prior art technique would result in an especially fragmented view of the graphical program in these cases.

Passing Data Among Frames

Two frames being visible at the same time enables the developer to specify data to be passed between the graphical source code portions associated with the frames much the same way as if the graphical source code portions were not associated with frames. Thus, in the preferred embodiment, the user may include a wire in the graphical program that visually indicates data flow between two frames. In other words, a wire may be displayed in response to user input, and endpoints for the wire may be defined in response to user input, such that a first endpoint of the wire is in a first frame and a second endpoint of the wire is in a second frame. The wire may be operable to cause data to be passed from the portion of the program associated with the first frame to the portion of the program associated with the second frame during execution of the graphical program. For example, the endpoint in the first frame may be an output terminal of a node in the first frame, and the endpoint in the second frame may be an input terminal of a node in the second frame.

Also, the graphical program may include graphical source code that is not associated with any frame. In a case such as this, data may be passed in to a frame from the graphical source code not associated with a frame. Conversely, data may be passed from a frame to the graphical source code not associated with a frame. In the latter case, during execution of the graphical program, the data may be immediately available to the portion of graphical source code not associated with a frame, without waiting for other frames to execute. (In the prior art technique described above, data could be passed out of a frame, but the data was not available to the portion of graphical source code not associated with a frame until all the frames had executed.)

Predefined Templates

In one embodiment, a graphical programming development environment may supply various predefined templates upon which to base a graphical program or program portion. Each template may correspond to a commonly performed type of program operation, and the user may include the template within the graphical program. For operations that need to perform a plurality of steps in sequential order, the templates may include a plurality of frames such as described above.

Figure 12:
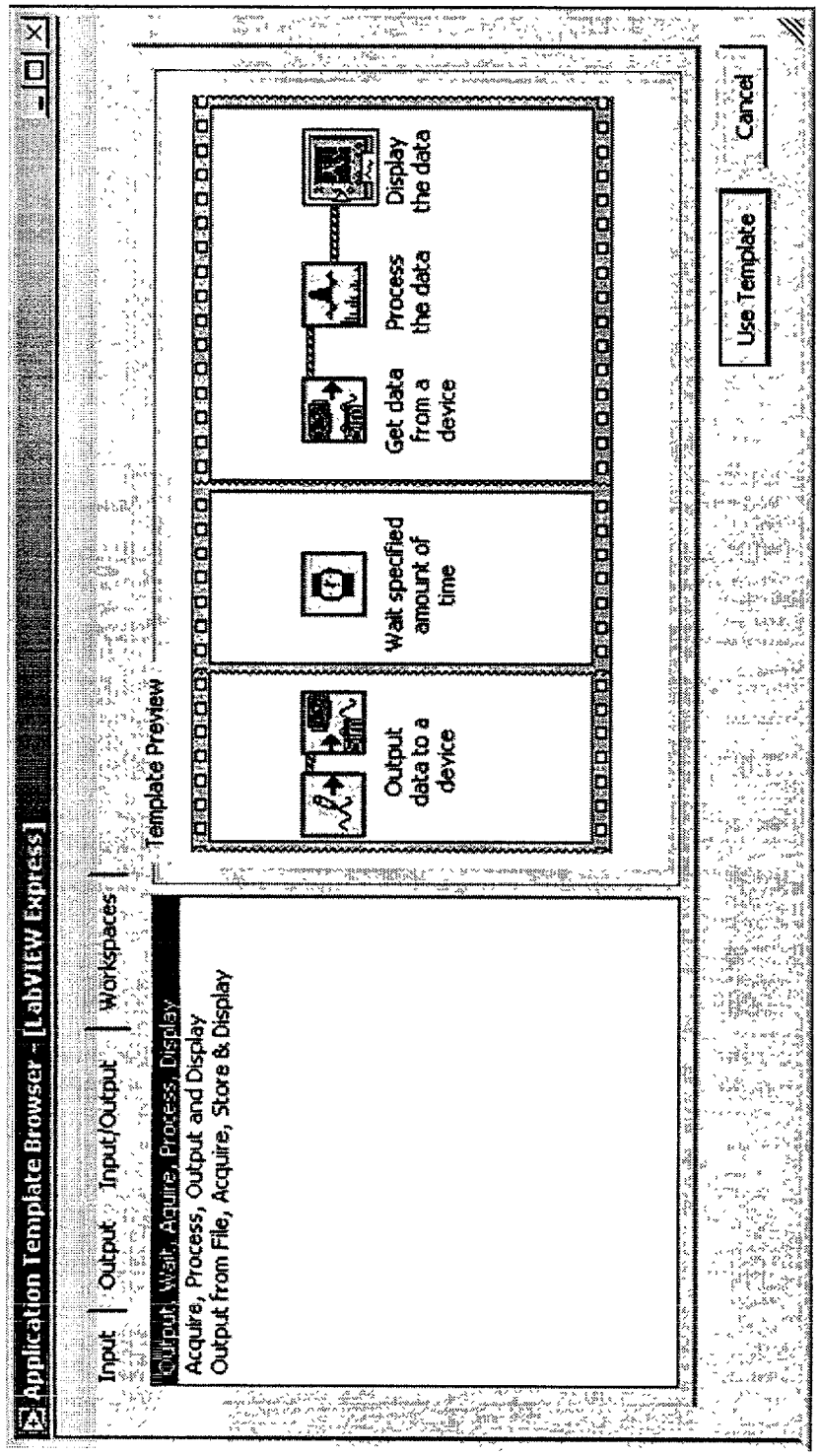
FIG. 12 illustrates a template browser window useable to select from various templates upon which a graphical program may be based, wherein a template is displayed that utilizes frames to specify sequential execution for different program portions.

FIG. 12 illustrates a template browser window. In this example, the template browser window is useable to select from various templates relating to instrumentation operations involving one or more devices, such as test and measurement operations. In FIG. 12, the user has selected a template labeled, "Output, Wait, Acquire, Process, Display". This template is shown in the Template Preview portion of the window. The template may be used to create a graphical program operable to output a signal to a device, wait for a period of time while the device processes the signal or performs an operation directed by the signal, and then read data from the device and process and display the data.

As shown, the template includes three frames to ensure that portions of the graphical program corresponding to the above-described steps are executed in the correct order, e.g., to ensure that the wait step is performed after the step of sending the signal to the device, etc. The first frame includes graphical source code operable to output data to a device. The second frame includes graphical source code operable to wait for a specified amount of time, e.g., while the device processes the output data from the first frame. The third frame includes graphical source code operable to read data from the device, process the data, and display the data.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for creating a graphical program including a plurality of portions of graphical source code to be executed sequentially, the method comprising:

displaying a plurality of frames in the graphical program such that two or more frames are visible at the same time, wherein the graphical program comprises a plurality of interconnected graphical program nodes that graphically represents functionality of the graphical program, and wherein the graphical program is executable by a computer system to perform the functionality;

including a portion of graphical source code in each frame in response to user input;

wherein for each frame, said including a portion of graphical source code in the frame in response to user input comprises including one or more graphical program nodes in the frame in response to user input;

wherein the plurality of frames define an execution order for the plurality of portions of graphical source code such that during execution of the graphical program the plurality of portions of graphical source code are executed sequentially in accordance with the execution order defined by the plurality of frames wherein the plurality of frames are displayed side by side to define an execution order for the plurality of portions of graphical source code such that during execution of the graphical program the plurality of portions of graphical source code are executed sequentially according to the execution order; and wherein a graphical depiction of a frame's location defines where it will execute relative to the other frames.

2. The method of claim 1, wherein the plurality of frames are displayed in the graphical program such that each frame is visible at the same time.

3. The method of claim 1, further comprising:

receiving user input indicating a desire to specify a plurality of portions of graphical source code to be executed sequentially;

wherein said displaying the plurality of frames in the graphical program is performed in response to receiving the user input indicating the desire to specify a plurality of portions of graphical source code to be executed sequentially.

4. The method of claim 1, wherein the plurality of frames are comprised in a sequence structure;

wherein said displaying the plurality of frames in the graphical program is performed in response to user input indicating a desire to include a sequence structure in the graphical program.

5. The method of claim 1, wherein each frame is displayed side by side in a left-to-right order;

wherein the plurality of frames define an execution order for the plurality of portions of graphical source code such that during execution of the graphical program the plurality of portions of graphical source code are executed sequentially in the left-to-right order.

6. The method of claim 1, further comprising:
executing the graphical program;
wherein said executing the graphical program comprises executing each portion of graphical source code sequentially according to the execution order defined by the plurality of frames.

7. The method of claim 1, wherein for each frame, said including a portion of graphical source code in the frame in response to user input further comprises:
if two or more nodes are included in the frame, interconnecting the two or more nodes in response to user input.

8. The method of claim 1, further comprising:
displaying a wire in response to user input;
defining endpoints for the wire in response to user input, such that a first endpoint of the wire is in a first frame having an associated first portion of graphical source code and a second endpoint of the wire is in a second frame having an associated second portion of graphical source code;
wherein the wire is operable to cause data to be passed from the first portion of graphical source code to the second portion of graphical source code during execution of the graphical program.

9. The method of claim 1, further comprising:
including a portion of graphical source code in the graphical program that is not associated with one of the frames.

10. The method of claim 9, further comprising:
displaying a wire in response to user input;
defining endpoints for the wire in response to user input, such that a first endpoint of the wire is in a first frame having an associated first portion of graphical source code and a second endpoint of the wire is in the portion of graphical source code that is not associated with one of the frames;
wherein the wire is operable to cause data to be passed from the first portion of graphical source code to the portion of graphical source code that is not associated with one of the frames during execution of the graphical program.

11. The method of claim 10,
wherein, in the execution order, the first frame comes before a second frame having an associated second portion of graphical source code;
wherein during execution of the graphical program, the data is passed from the first portion of graphical source code to the portion of graphical source code that is not associated with one of the frames without waiting for the second portion of graphical source code to be executed.

12. The method of claim 1,
wherein the plurality of frames is a first plurality of frames;
wherein for a first frame in the first plurality of frames, said including a portion of graphical source code in the first frame comprises nesting a second plurality of frames in the first frame;
wherein said nesting the second plurality of frames in the first frame comprises:
displaying the second plurality of frames in the first frame such that two or more frames of the second plurality of frames are visible at the same time;
including a portion of graphical source code in each frame of the second plurality of frames in response to user input;
wherein the portions of graphical source code included in the frames of the second plurality of frames comprise a second plurality of portions of graphical source code;
wherein the second plurality of frames define an execution order for the second plurality of portions of graphical source code such that during execution of the first frame in the first plurality of frames, the second plurality of portions of graphical source code are executed sequentially.

13. The method of claim 1,
wherein the graphical program is a graphical data-flow program.

14. The method of claim 1, wherein the graphical program is interpretable or compilable to generate instructions executable by the computer system.

15. The method of claim 1,
wherein the execution order for the plurality of portions of graphical source code is defined independently of data flow among the plurality of portions of graphical source code.

16. The method of claim 1,
wherein the plurality of frames provide a clear visual indication of the execution order for the plurality of portions of graphical source code.

17. The method of claim 1,
wherein each frame is displayed side by side in a top-to-bottom order;
wherein the plurality of frames define an execution order for the plurality of portions of graphical source code such that during execution of the graphical program the plurality of portions of graphical source code are executed sequentially in the top-to-bottom order.

18. The method of claim 1,
wherein the frames are displayed in a linear order such that adjacent frames appear to contact each other.

19. A system for creating a graphical program including a plurality of portions of graphical source code to be executed sequentially, the system comprising:
a processor;
a memory medium coupled to the processor;
wherein the memory medium stores program instructions which are executable by the processor to:
display a plurality of frames in the graphical program such that two or more frames are visible at the same time, wherein the graphical program comprises a plurality of interconnected graphical program nodes that graphically represents functionality of the graphical program, and wherein the graphical program is executable by a computer system to perform the functionality;
include a portion of graphical source code in each frame in response to user input;
wherein for each frame, in including a portion of graphical source code in the frame in response to user input, the program instructions are executable by the processor to include one or more graphical program nodes in the frame in response to user input;
wherein the plurality of frames define an execution order for the plurality of portions of graphical source code such that during execution of the graphical program the plurality of portions of graphical source code are executed sequentially in accordance with the execution order defined by the plurality of frames wherein the plurality of frames are displayed side by side to define an execution order for the plurality of portions of graphical source code such that during execution of the graphical program the plurality of portions of graphical source code are executed sequentially according to the execution order; and wherein no wires among the plurality of portions of graphical source code are required in order to define the execution order for the plurality of portions of graphical source code.

20. The system of claim 19, wherein the plurality of frames are displayed in the graphical program such that each frame is visible at the same time.

21. The system of claim 19, wherein the program instructions are further executable by the processor to receive user input indicating a desire to specify a plurality of portions of graphical source code to be executed sequentially;

wherein said displaying the plurality of frames in the graphical program is performed in response to receiving the user input indicating the desire to specify a plurality of portions of graphical source code to be executed sequentially.

22. The system of claim 19, wherein the plurality of frames are comprised in a sequence structure;

wherein said displaying the plurality of frames in the graphical program is performed in response to user input indicating a desire to include a sequence structure in the graphical program.

23. The system of claim 19, wherein each frame is displayed side by side in a left-to-right order;

wherein the plurality of frames define an execution order for the plurality of portions of graphical source code such that during execution of the graphical program the plurality of portions of graphical source code are executed sequentially in the left-to-fight order.

24. The system of claim 19, wherein the program instructions are further executable by the processor to execute the graphical program;

wherein said executing the graphical program comprises executing each portion of graphical source code sequentially according to the execution order defined by the plurality of frames.

25. The system of claim 19, wherein the graphical program is a graphical data-flow program.

26. The system of claim 19, wherein the graphical program is interpretable or compilable to generate instructions executable by the computer system.

27. The system of claim 19, wherein for each frame, in including a portion of graphical source code in the frame in response to user input, the program instructions are further executable by the processor to:

if two or more nodes are included in the frame, interconnect the two or more nodes in response to user input.

28. A memory medium for creating a graphical program including a plurality of portions of graphical source code to be executed sequentially, the memory medium comprising program instructions executable to:

display a plurality of frames in the graphical program such that two or more frames are visible at the same time, wherein the graphical program comprises a plurality of interconnected graphical program nodes that graphically represents functionality of the graphical program, and wherein the graphical program is executable by a computer system to perform the functionality;

include a portion of graphical source code in each frame in response to user input;

wherein for each frame, in including a portion of graphical source code in the frame in response to user input, the program instructions are further executable to include one or more graphical program nodes in the frame in response to user input;

wherein the plurality of frames define an execution order for the plurality of portions of graphical source code such that during execution of the graphical program the plurality of portions of graphical source code are executed sequentially in accordance with the execution order defined by the plurality of frames wherein the plurality of frames are displayed side by side to define an execution order for the plurality of portions of graphical source code such that during execution of the graphical program the plurality of portions of graphical source code are executed sequentially according to the execution order; and wherein no wires among the plurality of portions of graphical source code are required in order to define the execution order for the plurality of portions of graphical source code.

29. The memory medium of claim 28, wherein the plurality of frames are displayed in the graphical program such that each frame is visible at the same time.

30. The memory medium of claim 28, further comprising program instructions executable to:

receive user input indicating a desire to specify a plurality of portions of graphical source code to be executed sequentially;

wherein said displaying the plurality of frames in the graphical program is performed in response to receiving the user input indicating the desire to specify a plurality of portions of graphical source code to be executed sequentially.

31. The memory medium of claim 28, wherein the plurality of frames are comprised in a sequence structure;

wherein said displaying the plurality of frames in the graphical program is performed in response to user input indicating a desire to include a sequence structure in the graphical program.

32. The memory medium of claim 28, wherein each frame is displayed side by side in a left-to-right order;

wherein the plurality of frames define an execution order for the plurality of portions of graphical source code such that during execution of the graphical program the plurality of portions of graphical source code are executed sequentially in the left-to-right order.

33. The memory medium of claim 28, wherein the graphical program is a graphical data-flow program.

34. The memory medium of claim 28, wherein the graphical program is interpretable or compilable to generate instructions executable by the computer system.

35. The memory medium of claim 28, wherein for each frame, in including a portion of graphical source code in the frame in response to user input, the program instructions are further executable to:

if two or more nodes are included in the frame, interconnect the two or more nodes in response to user input.

* * * * *